（12) United States Patent
Yuan et al.

(10) Patent No.: US 12,383,891 B2
(45) Date of Patent: Aug. 12, 2025

(54) METHOD FOR PREPARATION OF HIERARCHICAL TS-1 MOLECULAR SIEVE

(71) Applicant: DALIAN INSTITUTE OF CHEMICAL PHYSICS, CHINESE ACADEMY OF SCIENCES, Dalian (CN)

(72) Inventors: Danhua Yuan, Dalian (CN); Jiacheng Xing, Dalian (CN); Yunpeng Xu, Dalian (CN); Zhongmin Liu, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 921 days.

(21) Appl. No.: 17/294,357

(22) PCT Filed: Nov. 15, 2018

(86) PCT No.: PCT/CN2018/115721
§ 371 (c)(1),
(2) Date: May 14, 2021

(87) PCT Pub. No.: WO2020/097878
PCT Pub. Date: May 22, 2020

(65) Prior Publication Data
US 2022/0008902 A1    Jan. 13, 2022

(51) Int. Cl.
*B01J 29/89* (2006.01)
*B01J 35/40* (2024.01)
(Continued)

(52) U.S. Cl.
CPC ............... *B01J 29/89* (2013.01); *B01J 35/40* (2024.01); *B01J 35/647* (2024.01); *B01J 37/04* (2013.01);
(Continued)

(58) Field of Classification Search
None
See application file for complete search history.

(56) References Cited

U.S. PATENT DOCUMENTS 2,920,089 A    1/1960 Samour
3,751,504 A    8/1973 Keown et al.
(Continued)

FOREIGN PATENT DOCUMENTS

CN    1475441 A    2/2004
CN    1506340 A    6/2004
(Continued)

OTHER PUBLICATIONS

Adedigba et al., On the synthesis and performance of hierarchical nanoporous TS-1 catalysts, Microporous and mesoporous materials, 2017 (Year: 2017).*
(Continued)

*Primary Examiner* — Coris Fung
*Assistant Examiner* — Keling Zhang
(74) *Attorney, Agent, or Firm* — Bayramoglu Law Offices LLC (57) ABSTRACT

The present application discloses a method for preparing a hierarchical porous TS-1 molecular sieve, which uses a silicon-titanium ester polymer as both titanium source and silicon source. In the method, silicon and titanium are uniformly connected to a same polymer, and the hydrolysis rates thereof are equivalent during hydrolysis, which can prevent $TiO_2$ precipitation and reduce the generation of non-framework titanium. Further, the silicon-titanium ester
(Continued)

polymer is not only used as both silicon source and titanium source, but also can be used as mesoporous template in the synthesis process. The obtained TS-1 molecular sieve has mesoporous structure with narrow pore size distribution, which plays an important role in promoting the application of TS-1 molecular sieve in the field of catalysis.

16 Claims, 3 Drawing Sheets

(51) Int. Cl.
B01J 35/64 (2024.01)
B01J 37/04 (2006.01)
B01J 37/08 (2006.01)
C01B 37/00 (2006.01)

(52) U.S. Cl.
CPC .............. B01J 37/08 (2013.01); C01B 37/005 (2013.01); C01P 2002/72 (2013.01); C01P 2004/03 (2013.01); C01P 2004/64 (2013.01); C01P 2006/16 (2013.01)

(56) References Cited

U.S. PATENT DOCUMENTS

| | | | |
|---|---|---|---|
| 3,751,506 | A | 8/1973 | Burress et al. |
| 4,016,218 | A | 4/1977 | Haag et al. |
| 4,547,605 | A | 10/1985 | Kresge et al. |
| 4,891,458 | A | 1/1990 | Innes et al. |
| 5,227,558 | A | 7/1993 | Shamshoum et al. |
| 9,896,343 | B2 | 2/2018 | Xia et al. |
| 10,967,350 | B2 | 4/2021 | Zhang et al. |
| 11,179,714 | B2 | 11/2021 | Liu et al. |
| 11,311,825 | B2 | 4/2022 | Zhang et al. |
| 2004/0059139 | A1 | 3/2004 | Cooker et al. |
| 2010/0076207 | A1 | 3/2010 | Le-Khac |
| 2020/0179891 | A1 | 6/2020 | Zhang et al. |
| 2021/0309590 | A1 | 10/2021 | Su et al. |
| 2021/0403332 | A1 | 12/2021 | Yuan et al. |
| 2021/0403333 | A1 | 12/2021 | Yuan et al. |
| 2022/0002481 | A1 | 1/2022 | Yuan et al. |
| 2022/0002496 | A1 | 1/2022 | Xing et al. |
| 2022/0008902 | A1 | 1/2022 | Yuan et al. |

FOREIGN PATENT DOCUMENTS

| | | | |
|---|---|---|---|
| CN | 1194944 | C | 3/2005 |
| CN | 1621347 | A | 6/2005 |
| CN | 1751996 | A | 3/2006 |
| CN | 101664695 | A | 3/2010 |
| CN | 101962195 | A | 2/2011 |
| CN | 102040459 | A | 5/2011 |
| CN | 102274746 | A | 12/2011 |
| CN | 102276413 | A | 12/2011 |
| CN | 102872899 | A | 1/2013 |
| CN | 102875315 | A | 1/2013 |
| CN | 103121909 | A | 5/2013 |
| CN | 104058423 | A | 9/2014 |
| CN | 104528759 | A | 4/2015 |
| CN | 104556104 | A * | 4/2015 |
| CN | 104556115 | A | 4/2015 |
| CN | 104843733 | A | 8/2015 |
| CN | 105597814 | A | 5/2016 |
| CN | 105665004 | A | 6/2016 |
| CN | 106379912 | A | 2/2017 |
| CN | 106395847 | A | 2/2017 |
| CN | 106629762 | A | 5/2017 |
| CN | 106914274 | A | 7/2017 |
| CN | 107032366 | A | 8/2017 |
| CN | 107552087 | A | 1/2018 |
| CN | 107915234 | A | 4/2018 |
| CN | 106379912 | B | 6/2018 |
| CN | 108658087 | A | 10/2018 |
| CN | 108726528 | A | 11/2018 |
| CN | 108793181 | A | 11/2018 |
| CN | 111186842 | A | 5/2020 |
| EA | 201000989 | A1 | 2/2011 |
| JP | H08-253313 | A | 10/1996 |
| JP | 2015-110219 | A | 6/2015 |
| JP | 2021524464 | A | 9/2021 |
| JP | 2021524969 | A | 9/2021 |
| KR | 2003-0082022 | A | 10/2003 |
| WO | 2008002463 | A2 | 1/2008 |
| WO | WO 2010036296 | A1 | 4/2010 |
| WO | 2010/143043 | A1 | 12/2010 |
| WO | 2011/077240 | A1 | 6/2011 |
| WO | 2016/099408 | A1 | 6/2016 |

OTHER PUBLICATIONS

Machine translation of Shu et al., CN 104556104 A (Year: 2015).*
Heng, "Synthesis, characterization and catalytic application of hierarchival porous IM-5 and TNU-9 zeolites," doctoral dissertation, Jilin University, Changchun, People's Republic of China, pp. 77-84.
Phonthammachai et al., "Crystallization and catalytic activity of high titanium loaded TS-1 zeolite," *Materials Chemistry and Physics* 97:458-467, 2006.
Saadoun et al., "1,2-Diolates of titanium as suitable precursors for the preparation of photoactive high surface titania," *Applied Catalysis B: Environmental* 21:269-277, 1999.
Shen et al., "Study on Synthesis Technology of Ethylene Glycol Alkoxides," *Chemical World* 52(1):2011, w/ English abstract, (5 pages).
Wang et al., "Hydrothermal Synthesis and Characterization of a Novel One-Dimensional Titanium Glycolate Complex Single Crystal: Ti(OCH2CH20)2," *Chemistry of Materials* 11(8):2008-2012, 1999.
Alba-Rubio et al., "Oxidation of furfural in aqueous $H_2O_2$ catalysed by titanium silicalite: Deactivation processes and role of extraframework Ti oxides," *Applied Catalysis B: Enviromental* 202:269-280, 2017.
Danov et al., "Influence of the Conditions for Obtaining a Titanium-Containing Zeolite on Its Catalytic Activity in the Process of Allichloride Epoxidation With Hydrogen Peroxide in Methanol Medium," *Journal of Applied Chemistry* 82(2):1843-1849, 2009. (with English Translation).
Fedosov et al., "Synthesis and characterization of hierarchical titanium-containing silicas using different size templates," *Journal of Chemical Sciences* 131:77, 2019. (9 pages).
Gao et al., "A green template-assisted synthesis of hierarchical TS-1 with excellent catalytic activity and recyclability for the oxidation of 2,3,6-trimethylphenol," *Microporous and Mesoporous Materials* 239:381-389, 2017.
Lv et al., "P123 lamellar micelle-assisted construction of hierarchical TS-1 stacked nanoplates with constrained mesopores for enhanced oxidative desulfurization," *Applied Catalysis A, General* 567:28-35, 2018.
Mikhailovich, "Catalysis in the Gas and Oil Industry Theory and practice," Ministry of Education and Science Russian State University of Oil and Gas, 2012. (3 pages) (with English Translation).
"Synthesis, characterization and catalytic application of hierarchical porous IM-5 and TNU-9 zeolites," Chinese Doctoral Dissertations Full-text Database, Engineering Science and Technology, URL= http://www.cdfd.cnki.net/Journal/Issue.aspx?dbCode=CDFD&PYKM=BBBD&Year=2014&Issue=09&Volume=01&QuervID-26, accessed May 10, 2020, 23 pages. (with English abstract).
Extended European Search Report, dated Mar. 29, 2022, for European Application No. 18927322.0-1104, 8 pages.
Hong et al., "Synthesis, Crystal Structure, Characterization, and Catalytic Properties of TNU-9," *J. Am. Chem. Soc.* 129:10870-10885, 2007.
Hong et al., "Synthesis, Structure Solution, Characterization, and Catalytic Properties of TNU-10: A High-Silica Zeolite with the STI Topology," *J. Am. Chem. Soc.* 126:5817-5826, Apr. 2004.
Hu et al., "Effect of mesopore structure of TNU-9 on methane dehydroaromatization," *RSC Advances* 4:26577-26584, 2014.

(56) References Cited

OTHER PUBLICATIONS

International Search Report, mailed Apr. 22, 2019, for International Application No. PCT/CN2018/097323, 5 pages.
Odedairo et al., "Ethylation of benzene: Effect of zeolite acidity and structure," *Applied Catalysis A: General* 385:31-45, 2010.
Portilla et al., "Structure-reactivity relationship for aromatics transalkylation and isomerization process with TNU-9, MCM-22 and ZSM-5 zeolites, and their industrial implications," *Applied Catalysis A: General* 393:257-268, 2011.
Abdul-Lateef Adedigba et al., On the synthesis and performance of hierarchical nanoporous TS-1 catalysts, Microporous and Mesoporous Materials, 2017-05-15, pp. 83-92.
Heng Liu, Synthesis, characterization and catalytic application of hierarchical porous IM-5 and TNU-9 zeolites, doctoral dissertation, Jilin University, Changchun, People's Republic of China, Apr. 2014, pp. 77-84.

\* cited by examiner

METHOD FOR PREPARATION OF HIERARCHICAL TS-1 MOLECULAR SIEVE

FIELD

The present application relates to a method for preparing hierarchical porous TS-1 molecular sieve, which belongs to the field of preparation of molecular sieve.

BACKGROUND

TS-1 molecular sieve is a kind of microporous molecular sieve with MFI topological structure. Due to the presence of tetrahedral $Ti^{4+}$ sites in its framework structure, it has a good catalytic effect on the selective oxidation of organic substances in the presence of $H_2O_2$, such as the epoxidation of olefins, the hydroxylation of phenol, the ammoximation of ketones, the oxidation of alkanes and other selective oxidation reactions. The catalytic oxidation process with TS-1 molecular sieve is pollution-free and the reaction conditions are mild, which overcomes the disadvantages of serious pollution and lengthy reaction process in the traditional process.

There are two main factors affecting the activity and stability of TS-1. One is the contents of framework titanium and non-framework titanium in the molecular sieve, and the other is the diffusion performance of the molecular sieve. For the former factor, due to the large radius of titanium atom, it is difficult to enter the MFI framework, and further the titanium source is easily hydrolyzed and polymerized to form titanium dioxide precipitate. Thus, it is difficult to avoid the formation of six-coordinated non-framework titanium during the synthesis of TS-1 molecular sieve. However, the existence of the non-framework titanium can promote the ineffective decomposition of $H_2O_2$ but is not conducive to the oxidation reaction catalyzed by TS-1. For the latter factor, the pore size of TS-1 molecular sieve is too small which refers to only 0.55 nm, which greatly limits the transmission and diffusion of the organic macromolecules in the catalyst and thus inhibits the reaction activity and service life of the catalyst.

The synthesis of TS-1 was originally reported by Taramasso et al. (U.S. Pat. No. 4,410,501). The synthesis of TS-1 used tetraethyl orthosilicate (TEOS) as silicon source, tetraethyl titanate (TEOT) as titanium source and tetrapropylammonium hydroxide (TPAOH) as template which were subject to hydrothermal crystallization at a temperature ranging from 130 to 200° C. in a reactor for a time ranging from 6 to 30 days. However, this method is cumbersome to operate, difficult to control conditions and has poor experimental repeatability. In addition, due to the difference in the hydrolysis rates of the silicon source and the titanium source, a large amount of non-framework titanium is formed, which affects the catalytic performance of TS-1 molecular sieve. Subsequently, Thangaraj et al. (zeolite, 12(1992), 943) pre-hydrolyzed tetraethyl orthosilicate in TPAOH aqueous solution, and then slowly added therein isopropanol solution of tetrabutyl titanate with a slower hydrolysis rate under vigorous stirring. And, TS-1 molecular sieve with less non-framework titanium was obtained. These improvements are mainly to control the hydrolysis process of the silicon source and the titanium source, so that the hydrolysis rate of the silicon source and the titanium source are more matched to inhibit the formation of non-framework titanium, thereby increasing the framework titanium content in the TS-1 molecular sieve.

For the diffusion problem of TS-1 molecular sieve, it is a common solution to introduce mesopores into the zeolite molecular sieve system to prepare the hierarchical porous molecular sieves. Due to the existence of hierarchical pores, the communication and diffusion performances of the catalyst material are greatly improved, thereby effectively enhancing the interaction between the guest molecules and the active sites. It is currently the most effective way to prepare hierarchical porous molecular sieves by using templates to construct mesoporous or macroporous structures in molecular sieve materials, including soft template method and hard template method. The soft template method is exemplified by Zhou Xinggui et al. (CN103357432A) and Zhang Shufen (CN102910643A), wherein Zhou Xinggui et al. (CN103357432A) uses polyether Pluronic F127 as the mesoporous template to synthesize mesoporous nano-TS-1 molecular sieve by dry gel method, and Zhang Shufen (CN102910643A) uses cetyltrimethylammonium bromide as mesoporous template to introduce mesoporous channels into the titanium silicate molecular sieve. The hard template method is exemplified by Chen Lihua et al. (CN104058423A) and Li Gang et al. (CN101962195A), wherein Chen Lihua et al. (CN104058423A) uses three-dimensional ordered macroporous-mesoporous hierarchical porous carbon material as the hard template to limit the growth of TS-1 nanocrystals in the three-dimensional ordered channels, and then removes the hard template to obtain hierarchical porous TS-1 molecular sieve; and Li Gang et al. (CN101962195A) uses cheap sugar instead of porous carbon materials as macroporous-mesoporous template agent, which is heated, carbonized and dehydrated to directly form hard template in the process of heat treatment of the TS-1 molecular sieve synthetic gel containing sugar to prepare dry gel, thereby obtaining hierarchical porous TS-1 molecular sieve. However, the activity and stability of the TS-1 molecular sieve need to be further improved.

SUMMARY

According to one aspect of the present application, a method for preparing a hierarchical porous TS-1 molecular sieve is provided. In the method, a silicon-titanium ester polymer is formed by connecting silicon source and a titanium source to a same polymer, and the polymer can match the hydrolysis rates of the silicon source and the titanium source more, prevent $TiO_2$ precipitation and facilitate the entry of titanium into the molecular sieve framework. The silicon-titanium ester polymer not only acts as both silicon source and titanium source during the synthesis process, but also can be used as mesoporous template. Therefore, the TS-1 molecular sieve obtained by this method has a mesoporous structure, narrow pore size distribution and contains less non-framework titanium.

The method for preparing the hierarchical porous TS-1 molecular sieve is characterized in that the silicon-titanium ester polymer is used as titanium source.

Optionally, the silicon titanium ester polymer serves as both titanium source and silicon source.

Optionally, the method comprises crystallizing a mixture containing the silicon-titanium ester polymer, a template and water to obtain the hierarchical porous TS-1 molecular sieve.

Optionally, the crystallization is hydrothermal crystallization.

Optionally, the silicon titanium ester polymer is shown in Formula I:

$$[Ti_a(RO_x)_{4/x}S_{(1-a)}]_n \quad \text{Formula I}$$

wherein, 0<a≤0.5, $RO_x$ is a group formed by losing H on OH of organic polyhydric alcohol $R(OH)_x$, and R is a group formed by losing x hydrogen atoms on hydrocarbon compounds, x≥2; n=2~30.

Optionally, x=2, 3 or 4 in Formula I.

Optionally, the silicon-titanium ester polymer has the following molecular formula: $[Ti_a(RO_x)_{4/x}Si_{(1-a)}]_n$; wherein 0<a≤0.5; $RO_x$ is an organic polyhydric alcohol, x≥2, preferably is 2, 3 or 4.

Optionally, the upper limit of a in Formula I is 0.05, 0.1, 0.15, 0.2, 0.25, 0.3, 0.35, 0.4, 0.45 or 0.5, and the lower limit thereof is 0.001, 0.005, 0.01, 0.02, 0.05, 0.1, 0.15, 0.2, 0.25, 0.3, 0.35, 0.4 or 0.45.

Optionally, the R in Formula I is selected from the groups formed by losing x hydrogen atoms on hydrocarbon compounds.

Optionally, R in Formula I is a group formed by losing x hydrogen atoms on $C_1$~$C_8$ hydrocarbon compounds.

Optionally, the silicon-titanium ester polymer is at least one of silicon-titanium acid ethylene glycol polyester, silicon-titanium acid butylene glycol polyester, silicon-titanium acid polyethylene glycol polyester, silicon-titanium acid glycerol polyester, silicon-titanium acid terephthalyl alcohol polyester.

Optionally, the silicon-titanium acid polyethylene glycol polyester comprises at least one of silicon-titanium acid polyethylene glycol 200 polyester, silicon-titanium acid polyethylene glycol 400 polyester, silicon-titanium acid polyethylene glycol 600 polyester, and silicon-titanium acid polyethylene glycol 800 polyester.

The method for preparing the silicon-titanium ester polymer comprises performing transesterification of raw materials containing titanate, silicate and polyhydric alcohol to obtain the silicon-titanium ester polymer.

Optionally, the titanate is at least one of compounds having a chemical formula shown in Formula II:

Formula II wherein $R^1$, $R^2$, $R^3$ and $R^4$ are independently selected from $C_1$~$C_8$ alkyl groups.

Optionally, the titanate comprises at least one of tetraethyl titanate, tetrabutyl titanate, tetraisopropyl titanate, tetrahexyl titanate and tetraisooctyl titanate.

Optionally, the silicate is at least one of compounds having a chemical formula shown in Formula III:

Formula III wherein, $R^5$, $R^6$, $R^7$ and $R^8$ are independently selected from $C_1$~$C_4$ alkyl group.

Optionally, the silicate comprises at least one of tetramethoxysilane, tetratetraethyl orthosilicate, tetrapropyl silicate and tetrabutyl silicate.

Optionally, the number of hydroxyl groups in the polyhydric alcohol is not less than two.

Optionally, the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

Optionally, the polyethylene glycol can be one or a mixture of any of polyethylene glycol 200, polyethylene glycol 400, polyethylene glycol 600 and polyethylene glycol 800.

Optionally, the polyethylene glycol comprises at least one of polyethylene glycol 200, polyethylene glycol 400, polyethylene glycol 600 and polyethylene glycol 800.

Optionally, the molar ratio of the polyhydric alcohol, titanate and silicate satisfies: (titanate+silicate): polyhydric alcohol=(0.8~1.2) x/4, titanate: silicate=0.01~1; wherein x is the number of moles of hydroxyl groups contained in each mole of polyhydric alcohol; the number of moles of the titanate, silicate, and polyhydric alcohol are all calculated by the number of moles of the substance itself.

Optionally, the upper limit of the molar ratio of (titanate+silicate) to polyhydric alcohol is 0.85x/4, 0.9x/4, 0.95x/4, 1.0x/4, 1.1x/4, 1.15x/4 or 1.2x/4, and the lower limit thereof is 0.8x/4, 0.85x/4, 0.9x/4, 0.95x/4, 1.0x/4, 1.1x/4 or 1.15x/4.

Optionally, the upper limit of the molar ratio of the titanate to the silicate is 0.02, 0.05, 0.08, 0.1, 0.2, 0.5, 0.8 or 1, and the lower limit thereof is 0.01, 0.02, 0.05, 0.08, 0.1, 0.2, 0.5 or 0.8.

Optionally, the conditions for the transesterification are that a reaction temperature ranges from 80 to 180° C., and a reaction time ranges from 2 to 10 hours in an inactive atmosphere.

Optionally, the inactive atmosphere includes at least one of nitrogen and inert gas atmosphere.

Optionally, the transesterification is carried out under stirring condition.

Optionally, the upper limit of the reaction temperature is 90° C., 100° C., 110° C., 120° C., 130° C., 140° C., 150° C., 160° C., 170° C. or 180° C., and the lower limit thereof is 80° C., 90° C., 100° C., 110° C., 120° C., 130° C., 140° C., 150° C., 160° C. or 170° C.

Optionally, the upper limit of the reaction time is 3 hours, 4 hours, 5 hours, 6 hours, 7 hours, 8 hours, 9 hours or 10 hours, and the lower limit thereof is 2 hours, 3 hours, 4 hours, 5 hours, 6 hours, 7 hours, 8 hours or 9 hours.

Optionally, the reaction time ranges from 2 to 6 hours.

Optionally, the conversion rate of the transesterification ranges from 60% to 80%.

Optionally, the conditions for the transesterification reaction further comprise performing vacuum distillation thereafter.

Optionally, the conditions of the vacuum distillation comprise that a vacuum degree ranges from 0.01 to 5 kPa, a vacuum distillation temperature ranges from 170 to 230° C., and a vacuum distillation time ranges from 0.5 to 5 hours.

Optionally, in the vacuum distillation process, the upper limit of the vacuum degree is 0.02 kPa, 0.05 kPa, 0.1 kPa, 0.5 kPa, 1 kPa, 2 kPa, 3 kPa, 4 kPa or 5 kPa, and the lower limit thereof is 0.01 kPa, 0.02 kPa, 0.05 kPa, 0.1 kPa, 0.5 kPa, 1 kPa, 2 kPa, 3 kPa or 4 kPa.

Optionally, in the vacuum distillation process, the upper limit of the vacuum distillation temperature is 180° C., 190° C., 200° C., 210° C., 220° C. or 230° C., and the lower limit thereof is 170° C., 180° C., 190° C., 200° C., 210° C. or 220° C.

Optionally, in the vacuum distillation process, the upper limit of a vacuum distillation time is 1 hour, 2 hours, 3 hours, 4 hours or 5 hours, and the lower limit thereof is 0.5 hour, 1 hour, 2 hours, 3 hours or 4 hours.

Optionally, the vacuum degree ranges from 1 to 5 kPa.

Optionally, the conversion rate of the transesterification is greater than 90%.

Optionally, the method comprises following steps:
a) mixing polyhydric alcohol, titanate and silicate, and then performing the transesterification under stirring conditions and in an inactive protection atmosphere, wherein the reaction temperature ranges from 80 to 180° C., and the reaction time ranges from 2 to 10 hours;
b) after the reaction in step a), performing vacuum distillation to prepare the silicon-titanium ester polymer, during which a vacuum degree ranges from 0.01 to 5 kPa, a reaction temperature ranges from 170 to 230° C., and a reaction time ranges from 0.5 to 5 hours.

As a specific embodiment, the method comprises:
1) mixing polyhydric alcohol, titanate and silicate uniformly in a three-necked flask, and performing the transesterification under stirring conditions during which a distillation device is connected to the three-necked flask and nitrogen is passed in the three-necked flask for protection, wherein the reaction temperature ranges from 80 to 180° C., the reaction time ranges from 2 to 10 hours, and the conversion rate of the transesterification ranges from 60% to 80%;
2) after step 1), connecting the distillation device to the water pump or oil pump for vacuum distillation to make the transesterification more complete, wherein the vacuum degree is controlled to range from 0.01 to 5kPa, the reaction temperature ranges from 170 to 230° C., the reaction time ranges from 0.5 to 5 hours, and the conversion rate of the transesterification is greater than 90%.

Optionally, the molar ratio of the silicon-titanium ester polymer, the template and water satisfies: template: silicon-titanium ester polymer=0.01~10; water: silicon-titanium ester polymer=5~500; wherein, the number of moles of the template is based on the number of moles of N atom in the template; the number of moles of the silicon-titanium ester polymer is calculated based on the sum of the silicon content and the titanium content in the silicon-titanium ester polymer; the silicon content in the silicon-titanium ester polymer is based on the number of moles of $SiO_2$, and the titanium content in the silicon-titanium ester polymer is based on the number of moles of $TiO_2$ and the number of moles of water is based on the number of moles of $H_2O$ itself.

Optionally, the upper limit of the molar ratio of the template to the silicon-titanium ester polymer is 0.02, 0.05, 0.08, 0.1, 0.2, 0.5, 0.8, 1, 2, 5, 8 or 10, and the lower limit thereof is 0.01, 0.02, 0.05, 0.08, 0.1, 0.2, 0.5, 0.8, 1, 2, 5 or 8. The number of moles of the template is calculated by the number of moles of N atom in the template, the number of moles of the silicon-titanium ester polymer is calculated by the sum of the silicon content and the titanium content therein, the silicon content in the silicon-titanium ester polymer is calculated by the number of moles of $SiO_2$, and the titanium content in the silicon-titanium ester polymer is calculated by the number of moles of $TiO_2$.

Optionally, the upper limit of the molar ratio of the water to the silicon-titanium ester polymer is 8, 10, 50, 80, 100, 150, 200, 250, 300, 350, 400, 450 or 500, and the lower limit thereof is 5, 8, 10, 50, 80, 100, 150, 200, 250, 300, 350, 400 or 450. The number of moles of the silicon-titanium ester polymer is calculated by the sum of the silicon content and the titanium content therein, the silicon content in the silicon-titanium ester polymer is calculated by the number of moles of $SiO_2$, the content of titanium in the silicon-titanium ester polymer is calculated by the number of moles of $TiO_2$, and the number of moles of the water is calculated by the number of moles of $H_2O$ itself.

Optionally, the molar ratio of the silicon-titanium ester polymer, the template and water satisfies: template: silicon-titanium ester polymer=0.05~8; water: silicon-titanium ester polymer=10~300; wherein, the number of moles of the template is based on the number of moles of N atom in the template; the number of moles of the silicon-titanium ester polymer is based on the sum of the silicon content and the titanium content in the silicon-titanium ester polymer; the silicon content in the silicon-titanium ester polymer is based on the number of moles of $SiO_2$, and the titanium content in the silicon-titanium ester polymer is based on the number of moles of $TiO_2$; and the number of moles of water is based on the number of moles of $H_2O$ itself.

Optionally, the template refers to at least one of organic base templates.

Optionally, the molar ratio of silicon-titanium ester polymer, the organic base template and water satisfies: organic base template/($SiO_2$+$TiO_2$)=0.01~10; $H_2O$/($SiO_2$+$TiO_2$)=5~500; wherein, the silicon content in the silicon-titanium ester polymer is calculated by moles of $SiO_2$, the titanium content in the silicon-titanium ester polymer is calculated by moles of $TiO_2$, and the content of the organic base template is calculated by the moles of N atom.

Optionally, the organic base template includes A which is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide and triethylpropylammonium halide.

Optionally, the organic base template further includes B which is at least one of aliphatic amine and alcohol amine compounds.

Optionally, the B includes at least one of ethylamine, diethylamine, triethylamine, n-butylamine, butanediamine, hexamethylenediamine, octanediamine, monoethanolamine, diethanolamine and triethanolamine Optionally, the organic base template is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide, triethylpropylammonium halide and the like. Alternatively, the organic base template is a mixture of these quaternary ammonium salts or quaternary ammonium bases and aliphatic amine or alcohol amine compounds which is exemplified as ethylamine, diethylamine, triethylamine, n-butylamine, butanediamine, hexamethylene diamine, octane diamine, monoethanolamine, diethanolamine, triethanolamine and the like.

Optionally, the conditions of crystallization are: the crystallization is conducted in sealed condition, a crystallization temperature ranges from 100 to 200° C., and the crystallization time under autogenous pressure does not exceed 30 days.

Optionally, the conditions of crystallization are that the crystallization is conducted in sealed condition, the crystallization temperature ranges from 110 to 180° C.,and the crystallization time under autogenous pressure ranges from 1 to 28 days.

Optionally, the conditions of crystallization are that the crystallization is conducted in sealed condition, the crystallization temperature ranges from 120 to 190° C., and the crystallization time under autogenous pressure ranges from 1 to 15 days.

Optionally, the upper limit of the crystallization temperature is 110° C., 120° C., 130° C., 140° C., 150° C., 160° C., 170° C., 180° C., 190° C. or 200° C., and the lower limit thereof is 100° C., 110° C., 120° C., 130° C., 140° C., 150° C., 160° C., 170° C., 180° C. or 190° C.

Optionally, the upper limit of crystallization time is 1 hour, 5 hours, 10 hours,15 hours, 20 hours, 1 day, 2days, 5days, 10days, 12days, 15days, 20days, 25days, 28 days or 30 days, and the lower limit thereof is 0.5 hour, 1 hour, 5 hours, 10 hours,15 hours, 20 hours, 1 day, 2days, 5days, 10days, 12days, 15days, 20days, 25days, or 28 days.

Optionally, the crystallization is performed dynamically or statically.

Optionally, the mixture is subject to aging or not subject to aging to obtain a gel mixture.

Optionally, the mixture undergoes crystallization after aging, and the conditions of aging are that an aging temperature is not higher than 120° C. for an aging time in a range from 0 to 100 hours.

Optionally, the conditions of aging are the aging temperature ranges from 0 to 120° C. for the aging time in a range from 0 to 100 hours.

Optionally, the conditions of aging are the aging temperature ranges from 20 to 80° C. for the aging time in a range from 0 to 80 hours.

Optionally, the aging is performed dynamically or statically.

Optionally, after the crystallization is completed, the solid product is separated, washed to be neutral, dried to obtain the hierarchical porous TS-1 molecular sieve.

Optionally, the method for preparing TS-1 molecular sieve comprises:

a) mixing the silicon-titanium ester polymer with an organic base template and water, and keeping the obtained mixture at a temperature not higher than 120° C. for aging for a time in a range from 0 to 100 hours to obtain a gel mixture;

b) crystalizing the gel mixture obtained in step a) under sealed conditions to obtain the hierarchical porous TS-1 molecular sieve, wherein the crystallization temperature is raised to a range from 100 to 200° C., a crystallization time ranges from 0 to 30 days under autogenous pressure.

As a specific embodiment, the method for preparing hierarchical porous TS-1 molecular sieve comprises:

a') mixing the silicon-titanium ester polymer with organic base template and water, and keeping the obtained mixture at a temperature not higher than 120° C. for stirring or static aging for a time in a range from 0 to 100 hours to obtain a gel mixture;

b') transferring the gel mixture obtained in step a') into a reactor which is then sealed, and crystalizing the gel mixture under the condition that the crystallization temperature is raised to a range from 100 to 200° C., a crystallization time ranges from 0 to 30 days under autogenous pressure;

e') after the crystallization is completed, separating the solid product, washing the same with deionized water to be neutral, and drying the same to obtain the hierarchical porous TS-1 molecular sieve.

Optionally, the TS-1 molecular sieve comprises mesopores, and the pore diameter thereof ranges from 2 to 50 nm.

Optionally, the TS-1 molecular sieve comprises mesopores, and the pore diameter thereof ranges from 2 to 5 nm.

Optionally, the TS-1 molecular sieve comprises mesopores, and the pore diameter thereof ranges from 2 to 3 nm.

Optionally, the particle size of the hierarchical porous TS-1 molecular sieve ranges from 100 to 500 nm.

Optionally, the particle size of the hierarchical porous TS-1 molecular sieve ranges from100 to 300 nm.

Optionally, the hierarchical porous TS-1 molecular sieve has a mesoporous structure with a narrower pore size distribution and less non-framework titanium.

Optionally, the TS-1 molecular sieve is used for the selective oxidation reaction of organic substances in the presence of $H_2O_2$.

The preparation process of the hierarchical porous TS-1 molecular sieve in the present invention is divided into two steps: the first step refers to performing transesterification of the silicate, titanate and polyhydric alcohol, and distilling the produced alcohol to obtain the silicon-titanium ester polymer; and the second step refers to hydrothermally crystallizing the silicon-titanium ester polymer, the organic base template and water in a reactor to obtain the hierarchical porous TS-1 molecular sieve. Compared with the conventional preparation process, silicon and titanium are uniformly connected to a same polymer, and the hydrolysis rates of silicon and titanium are equivalent which can prevent the $TiO_2$ precipitation and reduce the formation of non-framework titanium; and a new type of silicon-titanium ester polymer is not only used as a source of silicon and titanium, but also used as a mesoporous template. The obtained TS-1 molecular sieve has mesoporous structure and narrow pore size distribution.

In the present application, "$C_1$~$C_8$" and the like all refer to the number of carbon atoms contained in the alkyl group.

The beneficial effects that the present application can achieve comprise:

1) The silicon-titanium ester polymer provided in the present application serves as both silicon source and titanium source, and the ratio of silicon to titanium in the silicon-titanium ester polymer is adjustable, and the silicon and titamiun are uniformly distributed;

2) In the method of the present application, silicon and titanium are uniformly connected to a same polymer, and thus the hydrolysis rates are equivalent during hydrolysis, which can prevent $TiO_2$ precipitation;

3) In the method of the present application, the silicon-titanium ester polymer not only is used as both silicon source and titanium source, but also can be used as mesoporous template. The obtained TS-1 molecular sieve has a mesoporous structure and narrow pore size distribution, which plays an important role in promoting the application of TS-1 molecular sieve in the field of catalysis.

DETAILED DESCRIPTION

The present application will be described in detail below with reference to the examples, but the present application is not limited to these examples.

Unless otherwise specified, the raw materials in the examples of the present application are all commercially available.

In the present application, the X-Ray Diffraction Analysis (XRD) of the product is performed by the X' Pert PRO X-Ray Diffractometer from PANalytical Company, wherein the XRD is performed under conditions of the Cu target Kα radiation source ($\lambda$=0.15418 nm), electric voltage=40 KV, and electric current=40 mA.

In the present application, the SEM image of the product is obtained by Hitachi™3000 SEM.

In the present application, the ultraviolet-visible diffuse reflectance spectrum of the product is measured on a Varian Cary500 Scan UV-Vis spectrophotometer equipped with an integrating sphere.

In the present application, the physical adsorption, external specific surface area and pore size distribution analysis of the product are performed by the ASAP2020 automatic physics instrument from Mike.

In the present invention, the silicon-titanium ester polymer is used as both the silicon source and the titanium source, an organic base template and deionized water are added therein to synthesize the hierarchical porous TS-1 molecular sieve under hydrothermal conditions.

According to an embodiment of the present application, the method for preparing the hierarchical porous TS-1 molecular sieve is as follows:

a) mixing the silicon-titanium ester polymer, the organic base template and water in a certain proportion to obtain a gel mixture, wherein, preferably, the gel mixture has the following molar ratio: organic base template/($SiO_2$+$TiO_2$)=0.01~10; $H_2O$/($SiO_2$+$TiO_2$)=5 ~500; wherein the silicon content in the silicon-titanium ester polymer is calculated by the number of moles of $SiO_2$; the titanium content in the silicon titanium ester polymer is calculated by the number of moles of $TiO_2$ and the content of the organic base template is calculated by the number of moles of N atom;

b) subjecting the gel mixture obtained in step a) to an aging process, which can be omitted or can be carried out, wherein the aging can be carried out under stirring or static conditions, an aging temperature ranges from 0 to 120° C., and an aging time ranges from 0 to 100 hours;

c) transferring the gel mixture after step b) into a reactor which is then sealed, and crystalizing the gel mixture under the condition that the crystallization temperature is raised to a range from 100 to 200° C., and a crystallization time ranges from 1 to 30 days;

d) after the crystallization is completed, separating the solid product, washing the same with deionized water to be neutral, and drying the same to obtain the hierarchical porous TS-1 molecular sieve;

wherein, the organic base template is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide, triethylpropylammonium halide and the like; alternatively, the organic base template is a mixture of these quaternary ammonium salts or quaternary ammonium bases and aliphatic amine or alcohol amine compounds which is exemplified as ethylamine, n-butylamine, butanediamine, hexamethylene diamine, octanediamine, monoethanolamine, diethanolamine, triethanolamine and the like.

Preferably, the organic base template/($SiO_2$+$TiO_2$) =0.05~8 in the gel mixture in step a).

Preferably, $H_2O$/($SiO_2$+$TiO_2$)=10~300 in the gel mixture in step a).

Preferably, the aging process in step b) can be omitted or can be carried out, wherein an aging temperature ranges from 20 to 80° C., and an aging time ranges from 0 to 80 hours.

Preferably, in step c), the crystallization temperature ranges from 120 to 190° C., and the crystallization time ranges from 1 to 15 days.

Preferably, the crystallization process in step c) is performed statically or dynamically.

Preferably, the hierarchical porous TS-1 molecular sieve is obtained in the step d).

EXAMPLE 1

4.88 g tetrapropylammonium hydroxide (25 wt %) aqueous solution and 5 g water are added to 8 g silicon-titanium polyethylene glycol-200 polyester, which are mixed uniformly, and stirred at room temperature for 2 hours.

Figure 1:
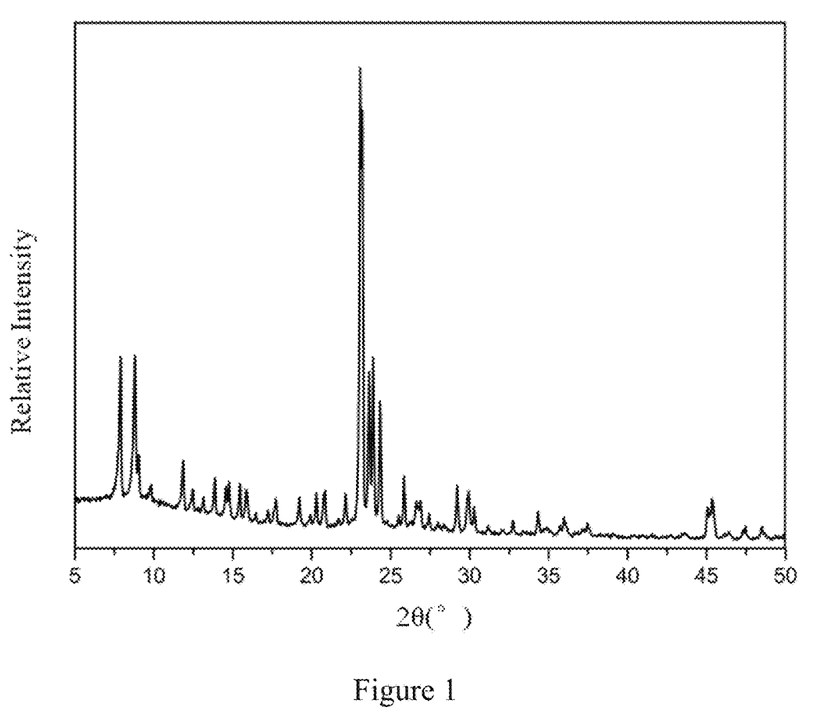
FIG. 1 shows XRD pattern of the product prepared according to Example 1 of the present invention.
Figure 2:
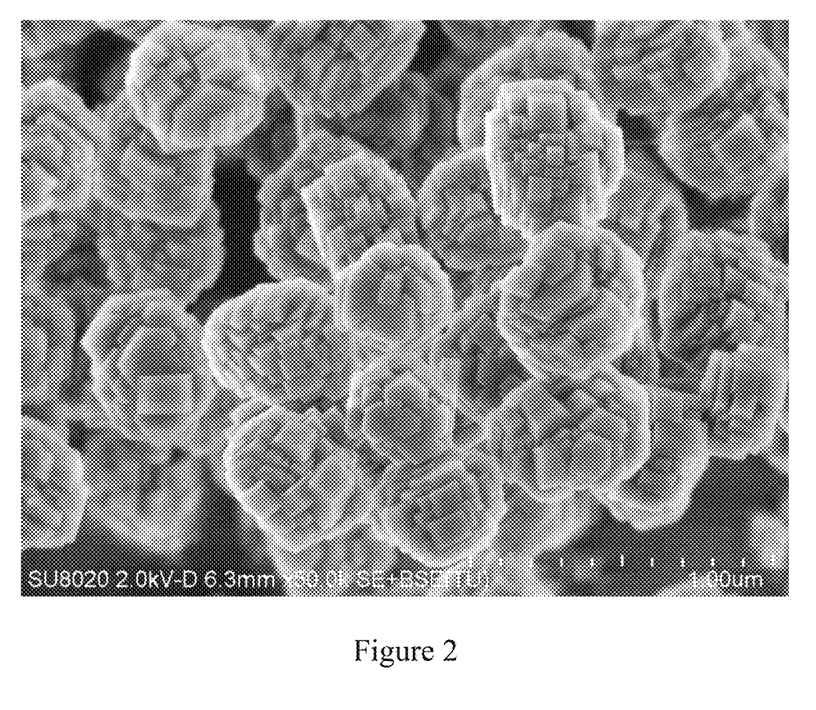
FIG. 2 shows SEM image of the product prepared according to Example 1 of the present invention.
Figure 3:
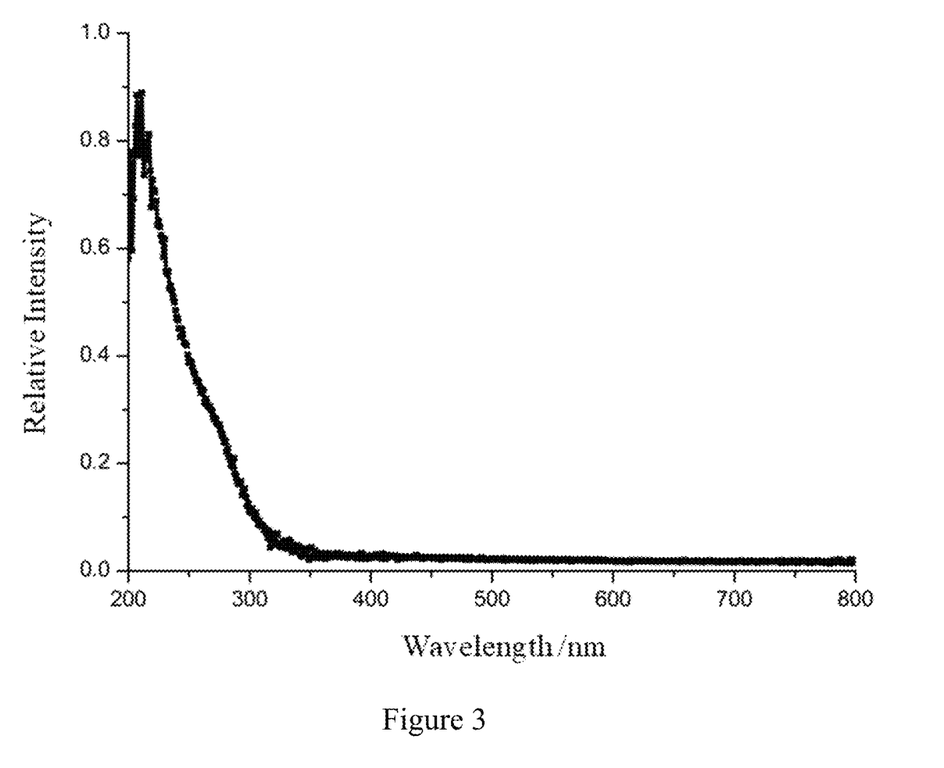
FIG. 3 shows ultraviolet-visible (UV-VIS) spectrum of the product prepared according to Example 1 of the present invention.
Figure 4:
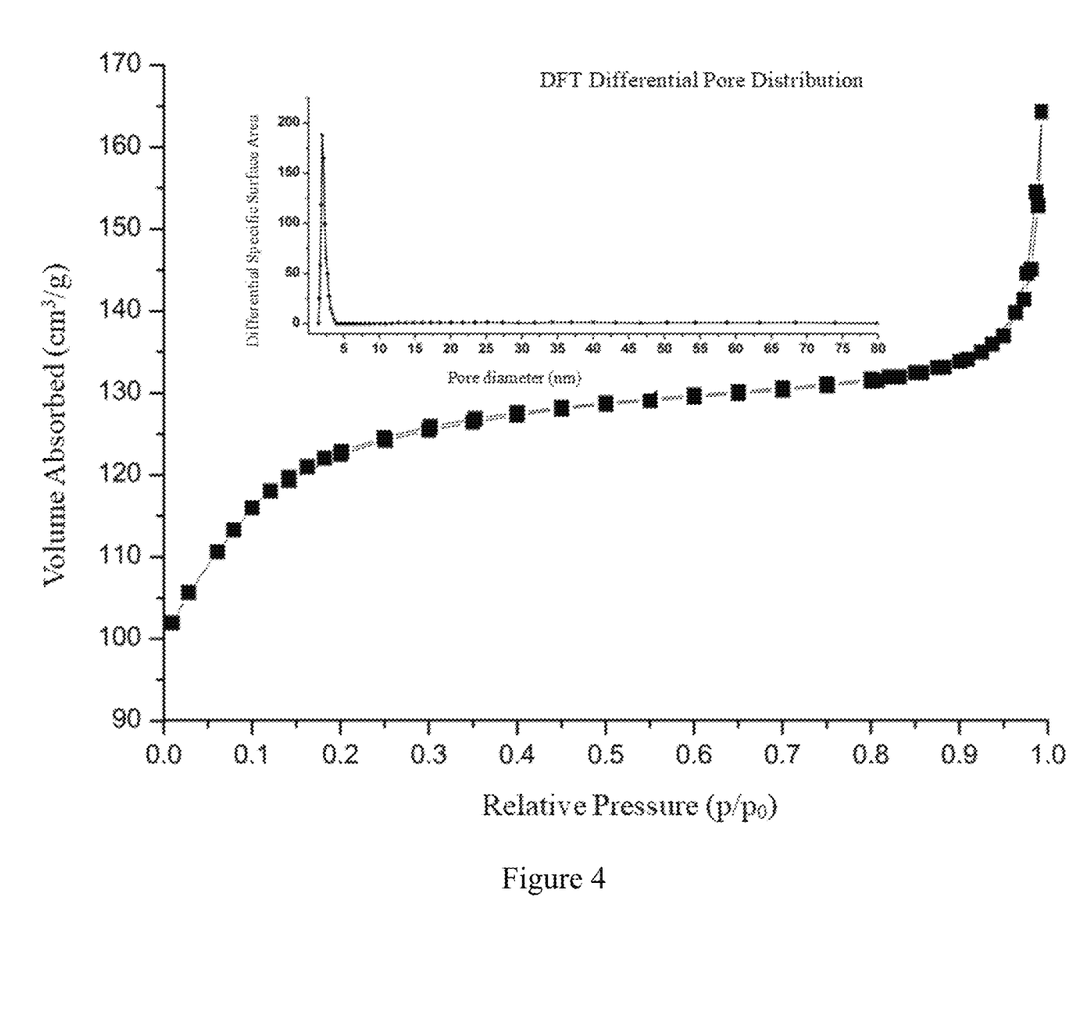
FIG. 4 shows the results of physical adsorption and pore size distribution of the product prepared according to Example 1 of the present invention.

Then, the obtained mixture is transferred to a stainless steel autoclave, wherein the molar ratio of all components herein is $[Ti_{0.05}(RO_x)_4/Si_{0.05}]_n$: 0.5TPAOH: 50$H_2O$, R is hexyl, x=2, n=20. The autoclave is sealed and placed in an oven that has been raised to a constant temperature of 170° C., and crystallization step under autogenous pressure is performed for 2 days. After crystallization is completed, the solid product is separated by centrifugation, washed with deionized water to be neutral, and dried in air at 110° C. to obtain a hierarchical porous TS-1 molecular sieve. The obtained hierarchical porous TS-1 molecular sieve is subject to XRD analysis, the result of which is shown in FIG. 1. As can be seen from FIG. 1, the obtained sample is proved to be TS-1 molecular sieve. The SEM image of the obtained hierarchical porous TS-1 molecular sieve is shown in FIG. 2. As can be seen from FIG. 2, the particle size thereof is around 100 nm. The UV-VIS diffuse reflectance spectrum of the obtained hierarchical porous TS-1 molecular sieve is shown in FIG. 3. As can be seen from FIG. 3, almost no non-framework titanium exists in the obtained hierarchical porous TS-1 molecular sieve. The physical adsorption and pore size distribution curves of the sample are shown in FIG. 4. As can be seen from FIG. 4, the obtained hierarchical porous TS-1 molecular sieve has mesopores of about 2 nm.

$RO_x$ is a group formed by losing x hydrogen atoms on the hydroxyl group on polyethylene glycol-200.

The method for preparing the silicon-titanium polyethylene glycol-200 polyester is as follows: 16.8 g PEG-200, 8.3 g tetraethyl orthosilicate and 0.5 g tetraethyl titanate are added into a three-necked flask which is connected to a distillation device, and then temperature is heat up to 175° C. under stirring and nitrogen protection, and the reaction time is 4 hours. During this process, a large amount of ethanol is distilled out, and the conversion rate of the transesterification is 90%. Then a vacuum device is connected to the distillation device, and the transesterification continues under vacuum distillation conditions, wherein the vacuum degree of the reaction system is controlled to be 1 kPa and the temperature is raised to 200° C. After reacting for 1 hour, the transesterification is stopped. After the temperature is naturally cooled to be room temperature, the resulting sample is taken, and the conversion rate of the transesterification is 95%.

The conversion rate of the transesterification in the Examples of the present application is calculated as follows.

According to the number of moles n of the by-product alcohols distilled out during the reaction, the number of groups participating in the transesterification is determined to be n, and the total number of moles of esters in the reaction raw materials is in, and then the conversion rate of the transesterification is n/xm; wherein x depends on the number of alkoxy groups connected to the central atom in the esters.

The prepared sample is subject to thermogravimetric test which is conducted by TA Q-600 thermogravimetric analyzer from TA Instruments. During the thermogravimetric test, the nitrogen flow rate is 100 ml/min, and the temperature is increased to 700° C. at a temperature rise rate of 10° C./min. According to the reaction conversion rate x, the degree of polymerization n of the product can be determined: n=1/(1−x). The chemical formula of the obtained sample is $[Ti_{0.05}(RO_x)_{4/x}Si_{0.95}]_n$, wherein R is the group formed by the loss of two hydrogen atoms on the hydroxyl groups of polyethylene glycol 200, x=2, n=20.

EXAMPLES 2 To 13

The specific raw materials, amounts thereof and reaction conditions different from Example 1 are shown in Table 1 below, and the other procedures are the same as those in Example 1.

TABLE 1

Raw materials, amounts thereof and reaction conditions of Examples 2 to 13

| Example Numbering | Silicon-titanium ester polymer (mol) | Organic base compound (mol) | water (mol) | Crystallization temperature (° C.) | Crystallization time (day) | XRD crystal form | External specific surface area (m² g⁻¹) |
|---|---|---|---|---|---|---|---|
| 2 | $[Ti_{0.05}(RO_x)_{4/x}Si_{0.95}]_n$<br>R is a group formed by losing two hydrogen atoms on the hydroxyl groups of ethylene glycol,<br>x = 2, n = 12<br>1 mol | Tetrapropylammonium hydroxide<br>0.5 mol | 50 mol | 170 | 4 | TS-1 | 185 |
| 3 | $[Ti_{0.01}(RO_x)_{4/x}Si_{0.90}]_n$<br>R is a group formed by losing two hydrogen atoms on the hydroxyl groups of 1,3-propanediol,<br>x = 2, n = 11<br>5 mol | Tetrapropylammonium hydroxide<br>0.5 mol | 50 mol | 170 | 4 | TS-1 | 145 |
| 4 | $[Ti_{0.03}(RO_x)_{4/x}Si_{0.70}]_n$<br>R is a group formed by losing three hydrogen atoms on the hydroxyl groups of glycerol,<br>x = 3, n = 10<br>2 mol | Tetrapropylammonium hydroxide<br>1 mol | 50 mol | 170 | 7 | TS-1 | 162 |
| 5 | $[Ti_{0.05}(RO_x)_{4/x}Si_{0.95}]_n$<br>R is a group formed by losing two hydrogen atoms on the hydroxyl groups of 1,4-butanediol,<br>x = 2, n = 12<br>0.02 mol | Tetrapropylammonium hydroxide<br>0.05 mol | 10 mol | 170 | 4 | TS-1 | 130 |
| 6 | $[Ti_{0.05}(RO_x)_{4/x}Si_{0.95}]_n$<br>R is a group formed by losing two hydrogen atoms on the hydroxyl groups of 1,6-hexanediol,<br>x = 2, n = 15<br>2 mol | Tetrapropylammonium hydroxide<br>10 mol | 300 mol | 170 | 1 | TS-1 | 235 |
| 7 | $[Ti_{0.05}(RO_x)_{4/x}Si_{0.95}]_n$<br>R is the group formed by losing two hydrogen atoms on the hydroxyl groups of terephthalyl alcohol,<br>x = 2, n = 10<br>0.3 mol | Tetrapropylammonium hydroxide<br>0.5 mol | 50 mol | 100 | 20 | TS-1 | 165 |
| 8 | $[Ti_{0.05}(RO_x)_{4/x}Si_{0.95}]_n$<br>R is a group formed by losing two hydrogen atoms on the hydroxyl groups of 1,4-cyclohexanediol,<br>x = 2, n = 11<br>0.1 mol | Tetrapropylammonium hydroxide<br>0.5 mol | 50 mol | 200 | 1 | TS-1 | 210 |
| 9 | $[Ti_{0.05}(RO_x)_{4/x}Si_{0.95}]_n$<br>R is the group formed by losing two hydrogen atoms on the hydroxyl groups of 1,4-cyclohexanedimethanol,<br>x = 2, n = 16<br>1 mol | Tetrapropylammonium hydroxide<br>0.1 mol + 5 mol<br>n-butylamine | 50 mol | 170 | 7 | TS-1 | 180 |
| 10 | $[Ti_{0.05}(RO_x)_{4/x}Si_{0.95}]_n$<br>R is a group formed by losing two hydrogen atoms on the hydroxyl groups of polyethylene glycol 200, | Tetrapropylammonium bromide<br>0.5 mol + 10 mol<br>n-butylamine | 50 mol | 170 | 7 | TS-1 | 175 |

TABLE 1-continued

Raw materials, amounts thereof and reaction conditions of Examples 2 to 13

| Example Numbering | Silicon-titanium ester polymer (mol) | Organic base compound (mol) | water (mol) | Crystallization temperature (° C.) | Crystallization time (day) | XRD crystal form | External specific surface area ($m^2\ g^{-1}$) |
|---|---|---|---|---|---|---|---|
| 11 | x = 2, n = 12<br>2 mol<br>$[Ti_{0.15}(RO_x)_{4/x}Si_{0.85}]_n$<br>R is a group formed by losing two hydrogen atoms on the hydroxyl groups of polyethylene glycol 400,<br>x = 2, n = 15<br>1 mol | Tetrabutylammonium hydroxide<br>1 mol + 0.1 mol tetrapropylammonium bromide | 150 mol | 170 | 0.5 | TS-1 | 150 |
| 12 | $[Ti_{0.05}(RO_x)_{4/x}Si_{0.95}]_n$<br>R is a group formed by polyethylene glycol 800 losing two hydrogen atoms on the hydroxyl group,<br>x = 2, n = 12<br>0.3 mol | Tetraethylammonium hydroxide<br>0.5 mol + 0.5 mol tetrapropylammonium bromide | 50 mol | 170 | 3 | TS-1 | 166 |
| 13 | $[Ti_{0.05}(RO_x)_{4/x}Si_{0.95}]_n$<br>R is a group formed by losing four hydrogen atoms on the hydroxyl groups of pentaerythritol,<br>x = 4, n = 16<br>3 mol | Hexanediamine<br>10 mol + 0.1 mol tetrapropylammonium bromide | 50 mol | 175 | 10 | TS-1 | 140 |

In Table 1, R is the group formed by losing x hydrogen atoms of hydrocarbon compounds, and is exemplified by ethyl, propyl, butyl, polyethylene glycol group, terephthalate group, x ranges from 2 to 6.
The crystallization in Examples 1 to 13 is static crystallization.

The method for preparing the silicon-titanium ester polymer in Examples 2 to 13 is the same as the method for preparing the silicon-titanium polyethylene glycol-200 ester polymer in Example 1. The difference is that 16.8 g polyethylene glycol 200 in Example 1 is replaced with 5 g ethylene glycol, 6.1 g 1,3-propanediol, 5 g glycerol, 7.2 g 1,4-butanediol, 9.5 g 1,6-hexanediol, 11.1 g terephthalyl alcohol, 9.3 g 1,4-cyclohexanediol, 11.5 g 1,4-cyclohexane dimethanol, 33.8 g polyethylene glycol 400, 65.6 g polyethylene glycol 800, 5.5 g pentaerythritol, respectively, to obtain the corresponding silicon-titanium ester polymer in Examples 2 to 13.

EXAMPLE 14

Except that the crystallization temperature is 100° C. and the crystallization time is 30 days, the other procedures are the same as those in Example 1.

The crystallization is dynamic, which is performed by using a rotating oven. The crystallization temperature and crystallization time are the same as those in Example 1, and the rotation speed of the rotating oven is 35 rpm.

EXAMPLE 15

Aging step is performed before crystallization, and the aging step is performed statically at 120° C. for 2 hours. The other procedures are the same as those in Example 1.

EXAMPLE 16

Aging step is performed before crystallization, and the aging step is performed at 20° C. for 80 hours. The other procedures are the same as those in Example 1.

EXAMPLE 17

Phase Structure Analysis

The samples prepared in Example 1 to Example 16 are subjected to XRD phase structure analysis respectively, results of which are typically shown in FIG. 1. FIG. 1 shows the XRD pattern of the sample prepared in Example 1. As can be seen from FIG. 1, the sample in Example 1 is proved to be TS-1 molecular sieve.

The test results of other samples are only slightly different from the samples in Example 1 in terms of the intensity of the diffraction peaks, and they are all proved to be TS-1 molecular sieves.

EXAMPLE 18

Morphology Test

The samples prepared in Example 1 to Example 16 are subjected to SEM morphology analysis respectively, results of which are typically shown in FIG. 2. FIG. 2 shows the SEM image of the sample prepared in Example 1. As can be seen from FIG. 2, the particle size of the sample in Example 1 is about 200 nm.

The test results of other samples are similar to the test result of the sample in Example 1, and the particle size of the samples ranges from 100 to 300 nm.

EXAMPLE 19

Spectrum Analysis

The samples prepared in Example 1 to Example 16 were subjected to UV-VIS diffuse reflectance spectrum analysis respectively, results of which are typically shown in FIG. 3. FIG. 3 shows UV-VIS diffuse reflectance spectrum of the sample prepared in Example 1. As can be seen from FIG. 3, the sample of Example 1 almost has no non-framework titanium.

The test results of other samples are similar to those of the sample in Example 1, and there is almost no non-framework titanium in the sample.

EXAMPLE 20

Pore Size Distribution Analysis

The samples prepared in Example 1 to Example 16 are subjected to physical adsorption and pore size distribution analysis respectively, results of which are typically shown in FIG. 4. FIG. 4 shows the results of physical adsorption and pore distribution of the sample prepared in Example 1. As can be seen from FIG. 4, the sample has mesopores of about 2 nm, and thus the pore size distribution of the sample is narrow.

The test results of other samples are similar to the test result of sample 1 in Example 1, and the samples all have mesopores of which the pore sizes range from 2 to 50 nm.

The above examples are only illustrative, and do not limit the present application in any form. Any change or modification, made by the skilled in the art based on the technical content disclosed above, without departing from the spirit of the present application, is equivalent example and falls within the scope of the present application.

The invention claimed is:

1. A method for preparing hierarchical porous TS-1 molecular sieve comprising performing hydrothermal crystallization of a mixture containing a silicon-titanium ester polymer, a template and water to obtain the hierarchical porous TS-1 molecular sieve;

wherein the silicon-titanium ester polymer is used as both titanium source and silicon source, wherein the silicon-titanium ester polymer is shown in Formula I:

$[Ti_a(RO_x)_{4/x}S_{(1-a)}]_n$  Formula I wherein, $0<a\leq0.5$, $RO_x$ is a group formed by losing H on OH of organic polyhydric alcohol $R(OH)_x$, and R is a group formed by losing x hydrogen atoms on hydrocarbon compound, $x>2$, $n=2\sim30$.

2. The method according to claim 1, wherein $x=2, 3$ or $4$ in Formula I.

3. The method according to claim 1, wherein the silicon-titanium ester polymer is at least one of silicon-titanium acid ethylene glycol polyester, silicon-titanium acid butylene glycol polyester, silicon-titanium acid polyethylene glycol polyester, silicon-titanium acid glycerol polyester, and silicon-titanium acid terephthalyl alcohol polyester.

4. The method according to claim 1, wherein a molar ratio of the silicon-titanium ester polymer, the template and water satisfies:

template: silicon-titanium ester polymer=0.01~10;
water: silicon-titanium ester polymer=5~500;

wherein, a number of moles of the template is based on a number of moles of N atom in the template;
a number of moles of the silicon-titanium ester polymer is based on a sum of silicon content and titanium content in the silicon-titanium ester polymer;
the silicon content in the silicon-titanium ester polymer is based on a number of moles of $SiO_2$, and the titanium content in the silicon-titanium ester polymer is based on a number of moles of $TiO_2$; and
a number of moles of water is based on the number of moles of $H_2O$ itself.

5. The method according to claim 4, wherein a molar ratio of the silicon-titanium ester polymer, the template and water satisfies:

template: silicon-titanium ester polymer=0.05~8;
water: silicon-titanium ester polymer=10~300;

wherein, the number of moles of the template is based on the number of moles of N atom in the template;
the number of moles of the silicon-titanium ester polymer is based on the sum of silicon content and titanium content therein;
a silicon content in the silicon-titanium ester polymer is based on the number of moles of $SiO_2$, and a titanium content in the silicon-titanium ester polymer is based on the number of moles of $TiO_2$; and
the number of moles of water is based on the number of moles of $H_2O$ itself.

6. The method according to claim 1, wherein the template is at least one of organic base templates.

7. The method according to claim 6, wherein the at least one of the organic base templates includes A which is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide, and triethylpropylammonium halide.

8. The method according to claim 7, wherein the at least one of the organic base templates further includes B which is at least one of aliphatic amine and alcohol amine compounds.

9. The method according to claim 8, B includes at least one of ethylamine, diethylamine, triethylamine, n-butylamine, butanediamine, hexamethylenediamine, octanediamine, monoethanolamine, diethanolamine, and triethanolamine.

10. The method according to claim 1, wherein conditions of crystallization are: the crystallization is conducted in sealed condition, a crystallization temperature ranges from 100 to 200° C., and a crystallization time under autogenous pressure does not exceed 30 days.

11. The method according to claim 10, wherein the conditions of crystallization are: the crystallization is conducted in sealed condition, a crystallization temperature ranges from 110 to 180° C., and the crystallization time under autogenous pressure ranges from 1 to 28 days.

12. The method according to claim 10, wherein the conditions of crystallization are: the crystallization is conducted in sealed condition, the crystallization temperature ranges from 120 to 190° C., and the crystallization time under autogenous pressure ranges from 1 to 15 days.

13. The method according to claim 1, wherein the mixture undergoes crystallization after aging, and conditions of aging are that aging temperature is not higher than 120° C. for an aging time in a range from 0 to 100 hours.

14. The method according to claim 1 following steps:
a) mixing the silicon-titanium ester polymer with an organic base template and water, and keeping the obtained mixture at a temperature not higher than 120° C.° C. for aging for a time in a range from 0 to 100 hours to obtain a gel mixture;
b) crystalizing the gel mixture obtained in step a) under sealed conditions to obtain the hierarchical porous TS-1 molecular sieve, wherein a crystallization temperature is raised to a range from 100 to 200° C., and a crystallization time does not exceed 30 days under autogenous pressure.

15. The method according to claim 1, wherein the TS-1 molecular sieve comprises mesopores, and a pore diameter thereof ranges from 2 to 50 nm.

16. The method according to claim 1, wherein a particle size of the hierarchical porous TS-1 molecular sieve ranges from 100 to 500 nm.

* * * * *